(12) United States Patent
Adler

(10) Patent No.: US 6,373,969 B1
(45) Date of Patent: Apr. 16, 2002

(54) CORRECTIVE OPTICAL COMPONENT

(75) Inventor: Andrew Adler, Ottawa (CA)

(73) Assignee: Activcard Ireland, Limited, Dublin (IE)

( * ) Notice: Subject to any disclaimer, the term of this patent is extended or adjusted under 35 U.S.C. 154(b) by 0 days.

(21) Appl. No.: 09/267,615

(22) Filed: Mar. 15, 1999

(51) Int. Cl.⁷ .................................................. G06K 9/00
(52) U.S. Cl. ...................................... 382/127; 382/116
(58) Field of Search ................................. 382/114, 115, 382/116, 124, 126; 356/71

(56) References Cited

U.S. PATENT DOCUMENTS

| | | | | |
|---|---|---|---|---|
| 3,975,711 A | * | 8/1976 | McMahon | 382/126 |
| 4,905,293 A | * | 2/1990 | Asai | 382/126 |
| 5,177,802 A | * | 1/1993 | Fujimoto et al. | 382/124 |
| 5,963,657 A | * | 10/1999 | Bowker et al. | 382/127 |

* cited by examiner

*Primary Examiner*—Andrew W. Johns
*Assistant Examiner*—Seyed Azarian
(74) *Attorney, Agent, or Firm*—Freedman & Associates

(57) ABSTRACT

An optical imaging device such as a fingerprint imager is disclosed that has an optical modification to reduce perspective distortion in a read image. The optical modification is a contoured lens, a contoured platen recess, a contoured output port, or a contoured reflective surface that compensates for perspective distortion. The optical modification is provided by a complex optical surface and is distinct for a uniformly planar, spherical or cylindrical lens. In addition, a method for determining a perspective distortion correction is disclosed.

19 Claims, 8 Drawing Sheets

CORRECTIVE OPTICAL COMPONENT

FIELD OF THE INVENTION

This invention relates generally to optical components and more particularly to optical components for correction of perspective distortion.

BACKGROUND OF THE INVENTION

Over the course of history many different measurement standards have been developed. In one kingdom, the use of the king's foot was used as a standard and in another kingdom the use of another kings foot was used as a standard. A problem arose when someone from one kingdom communicated a distance, in feet, to someone in another kingdom. This was solved with the use of international standard units for measurement.

In some biometric measurements devices a measured biometric template is only comparable to a biometric template measured on the same or a similar system. One reason that measurements are not standardized is that the biometric template is a perturbed image and not a "true" representation of its biometric surface. This situation is particularly evident in optical finger print readers.

To overcome this problem, some systems employ software algorithms for correcting images of biometric surfaces. Unfortunately, software algorithms either rely on culling information which reduces the overall information content of an image or on extrapolation which adds unreliable information to an image. It would be very beneficial to provide a system that overcomes these disadvantages.

In an optical fingerprint input transducer or sensor, the finger under investigation is usually pressed against a flat surface, a platen, such as a side of a glass plate, and the ridge and valley pattern of the finger tip is sensed by a sensing means such as an interrogating light beam. Various optical devices are known which employ prisms upon which a finger whose print is to be identified is placed. The prism has a first surface, the platen, upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this type are generally used to control the building-access or information-access of individuals to buildings, rooms, and devices such as computer terminals.

One reason for the use of software correction of fingerprint data from optical finger print sensors is the use of angled surfaces. The use of the angled surfaces induces a perspective effect to measured biometric data. This perspective effect is very much the same as when a picture is angled away from a viewer. Pictorial objects of the same size on the picture appear to be of different sizes.

It has now been found that it is possible to correct for perspective distortion in optical fingerprint readers without a substantial reduction in imaged information. By providing a more accurate representation of a biometric surface using corrective optics, it is now possible to provide biometric templates having higher resolution relative to an image sensor used.

OBJECT OF THE INVENTION

Thus, in an attempt to overcome these and other limitations of prior art devices, it is an object of this invention to provide an improved optical fingerprint-imager. It is also an object of the invention to provide corrective optical component for use in an optical contact imager.

SUMMARY OF THE INVENTION

Thus, in accordance with the present invention, an optical contact imaging device is provided comprising: an input port; a platen having a surface for receipt of a finger surface; an output port; a perspective correction optical component; a detector; and, an interrogating light source for launching light into the input port such that the light is incident on and reflected by the platen surface, emerges from the output port and is incident on the detector to provide a detected signal, wherein the light is perturbed by the perspective correction optical component such that perspective distortion is reduced.

In accordance with another aspect of the invention, a perspective correction optical component is provided comprising: a platen; an input port for receipt of light such that the light reflects off the platen; and, an output port for light reflected off the platen to emerge, wherein the output port comprises a complex surface and the complex surface is for correcting perspective distortion.

In accordance with the invention there is further provided, a perspective correction optical component comprising: a platen for receipt of a fingertip, wherein the platen comprises a recessed complex surface and the recessed complex surface is for reducing perspective distortion; an input port for receipt of light such that the light reflects off the platen; and, an output port for light reflected off the platen to emerge.

In accordance with the invention there is further provided a method of determining a perspective distortion correction for an optical fingerprint-imager having a platen and an image sensor such that light incident on and reflected by the platen is incident on the detector, the method comprising the steps of: (i) taking a first scan line on the platen; (ii) correlating the first scan line on the platen with a first image line on the detector; (iii) determining an optically corrective equation, describing an optical contour of an optical component, which correlates the first scan line on the platen with a second image line on the detector, wherein the first a scan line on the platen is proportional to the second image line on the detector.

In accordance with the invention there is still further provided a method of determining a perspective distortion correction for an optical fingerprint-imager having a platen and an image sensor such that light incident on and reflected by the platen is incident on the detector, the method comprising the steps of: (i) correlating a first reading coordinate on the platen with a first image coordinate on the image sensor; (ii) correlating a second reading coordinate on the platen with a second image coordinate on the image sensor; (iii) correlating a third reading coordinate on the platen with a third image coordinate on the image sensor; (iv) determining a two dimensional relationship between the first, second and third reading coordinates on the platen; (v) determining a two dimensional relationship between the first, second and third image coordinates on the image sensor; and, (v) determining contours of an optical surface for perturbing the light such that the first, second and third reading coordinates on the platen are substantially proportional to the first, second and third image coordinates on the image sensor.

BRIEF DESCRIPTION OF THE DRAWINGS

Exemplary embodiments of the invention will now be described in conjunction with the following drawings, in which:

FIG. 2b is a magnified portion of the multi-prism of FIG. 2a;

In the following detailed description of the invention, the same numbering will be used in different figures to designate similar components.

DETAILED DESCRIPTION

Figure 1:
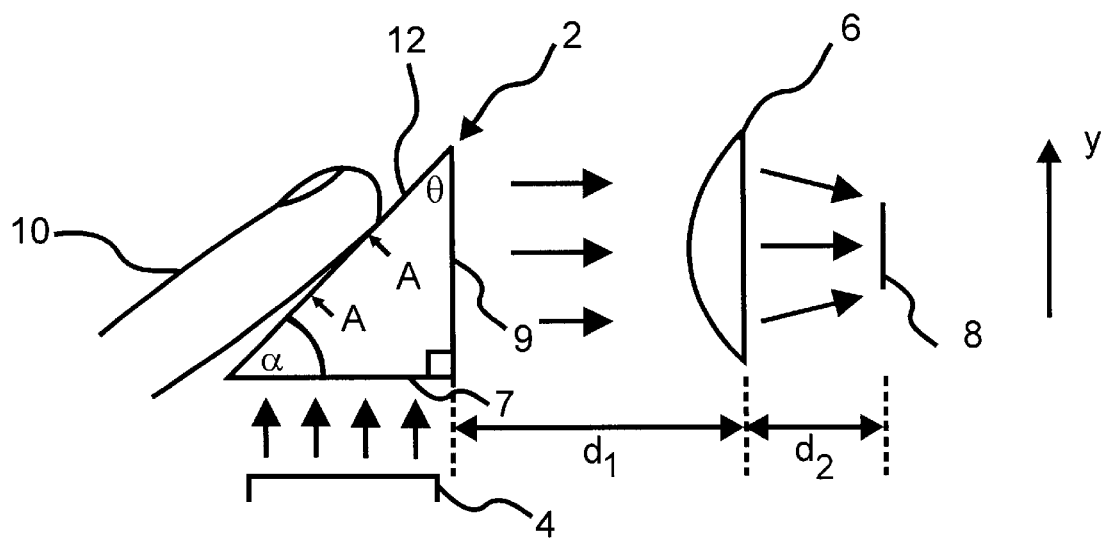
FIG. 1 is a side view of a prior art apparatus for identifying fingerprints.

Referring to FIG. 1, shown is a side view of a prior art optical fingerprint-imaging device. The optical fingerprint-imaging device comprises: a prism 2; a light source 4; a lens 6; and an image sensor 8. The size of the prism is consistent with the size of a typical human fingertip. An amplifying circuit, not shown, is also part of the device. In operation, a finger 10 is placed on a platen 12, which is an interrogating surface forming part of the prism 2. The light source 4 launches interrogating light into an input port 7 of the prism 2. The interrogating light is incident on and reflected from the platen 12. Portions of the finger 10 touching the platen 12 change the reflective properties of the platen 12. Interrogating light reflected by the platen emerges from an output port 9 of the prism 2 and the lens 6 focuses the emerging light onto the image sensor 8. The image sensor 8 is typically a charge coupled device (CCD) array. As is evident from FIG. 1, the distance from the platen 12 to the image sensor 8 is not constant. The reason that the distance is not constant is that the platen 12 subtends an angle θ to its output port 9. The prior art optical fingerprint-imaging device produces an image of a sensed fingerprint. Generally, the imaged fingerprint is only comparable to another imaged fingerprint from the same or a similar optical fingerprint-imaging device. The image sensor 8, in effect, is imaging an image of a fingerprint angled towards it and hence the imaged fingerprint is not "true"; the imaged fingerprint has perspective distortion. The perspective distortion increases with the angle θ.

Referring again to FIG. 1, lines A and B extending into the page are designated on the platen 12 for illustrative purposes. A surface of the same size presented along the line A and the line B are imaged differently at the detector. The surface along line A appears smaller than the surface along line B.

Figure 2A:
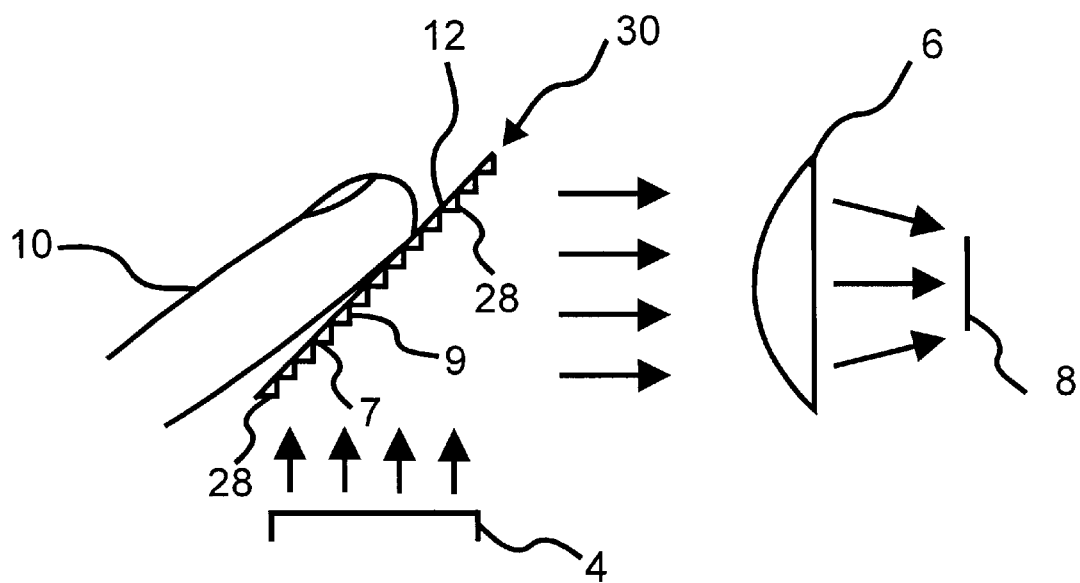
FIG. 2a is a side view of a prior art apparatus for identifying fingerprints using a multi-prism.
Figure 2B:
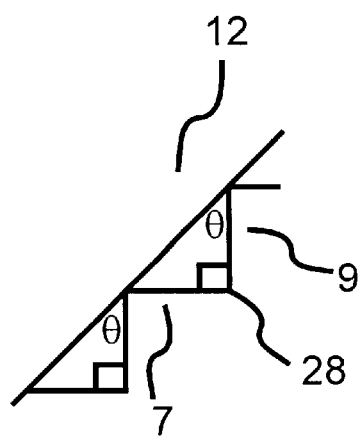

Referring to FIG. 2a, shown is a side view of another prior art optical fingerprint-imaging device in which a conventional prism is replaced by a multi-prism 30 having a platen 12. The staircase-shaped multi-prism 30 is a plurality of small prisms 28 secured to a common backing. Alternatively, the multi-prism 30 is formed of a single piece of material in the desired shape. In operation, a finger 10 is placed on the platen 12, which is an interrogating surface of the multi-prism 30. The light source 4 launches interrogating light into input ports 7 of the prisms 28 forming part of the multi-prism 30. The interrogating light is incident on and reflected by the platen 12. Portions of the finger 10 touching the platen 12 change the reflective properties of the platen 12. Interrogating light reflected by the platen emerges from output ports 9 of the prisms 28 forming part of the multi-prism 30 and the lens 6 focuses the emerging light onto an image sensor 8. Referring to FIG. 2b, shown is a side view of a magnified portion of the staircase-shaped prism 30 of FIG. 2a. The platen 12 subtends an angle θ to the output ports 9. In a similar manner to the optical fingerprint-imaging device of FIG. 1, an imaged fingerprint is not "true"; the imaged fingerprint has perspective distortion.

Figure 1B:
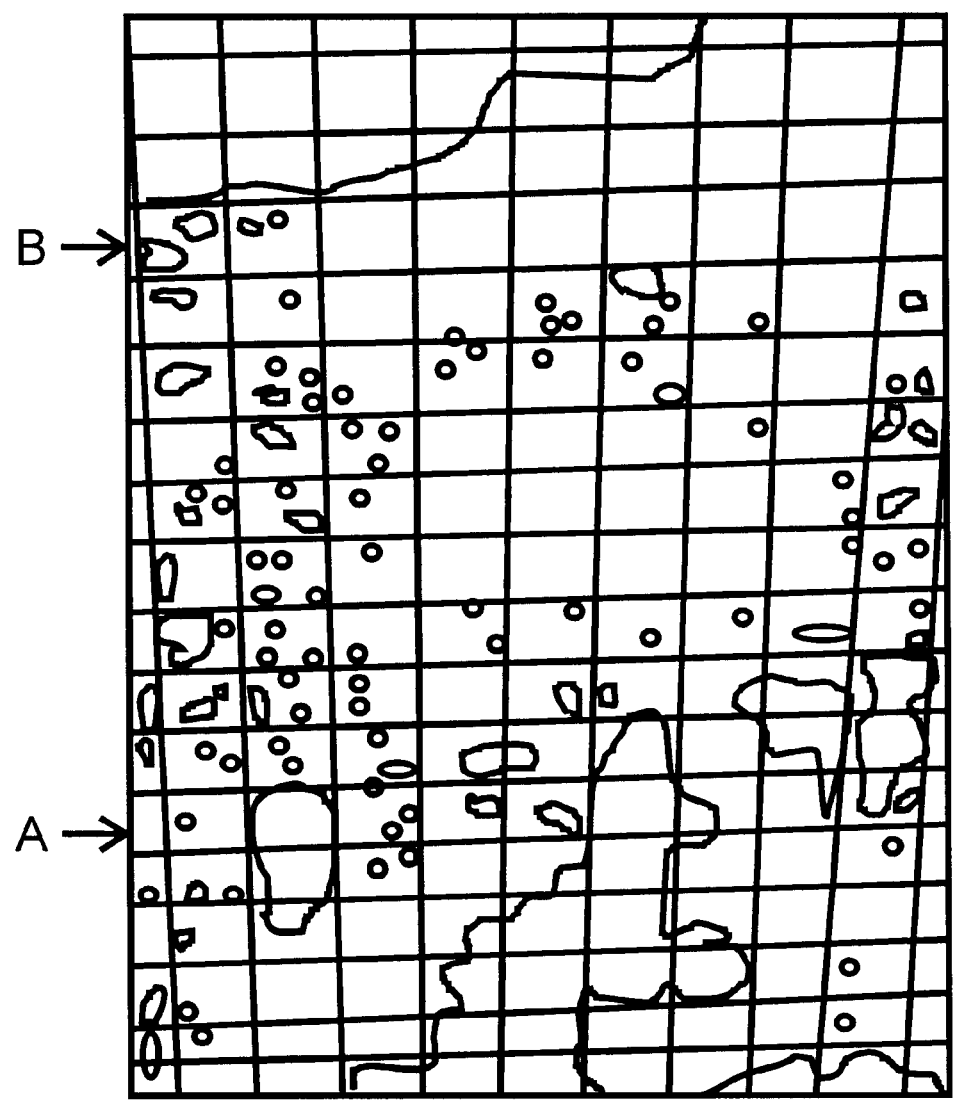
FIG. 1b is an image of a grid captured using a prior art optical contact imager.

Referring to FIG. 1b, an image of a grid captured with a prior art optical contact imager is shown. As is evident from the image the squares of the grid appear rectangular and there are fewer rectangles at the top of the image than at the bottom. This effectively reduces the amount of information within the image. Software image correction, when performed, discards unnecessary information resulting in an image with a square grid having only the grid elements shown.

Referring again to FIG. 1 and FIG. 2a, one possible approach to reducing perspective distortion would be to angle the image sensor 8 such that it is parallel to the platen surface. Unfortunately, angling of the image sensor 8 parallel to the platen surface 12 is difficult and complicates manufacture. Further, only some distortion is removed. Since the angle effectively causes the image sensor 8 and the platen surface 12 to remain equidistant, it varies the distance between each point on the surface of the image sensor 8 and the lens 6. This introduces other distortions. An angled CCD array requires a larger surface to detect the same area of the platen surface 12 as a CCD array disposed as shown in FIG. 1. Further, positioning a CCD array at an angle other than perpendicular to a light source detracts from its sensitivity.

Figure 3A:
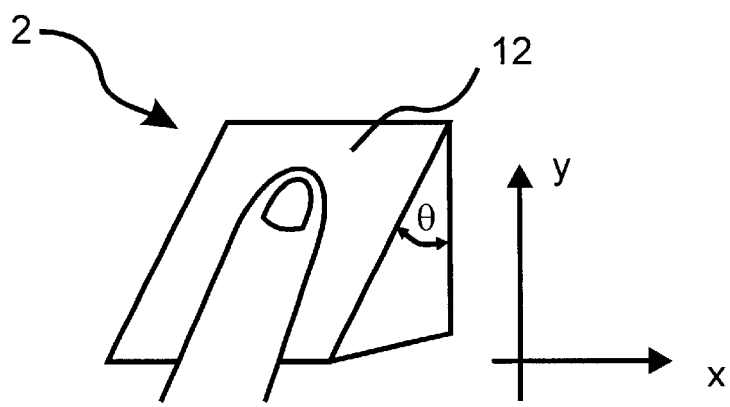
FIG. 3a is a perspective diagram of an optical component of FIG. 1.

Referring to FIG. 3a, shown is a perspective view of the prism 2 of FIG. 1. An image of a fingerprint presented on the platen 12 is distorted along both the x-axis and y-axis directions and hence it is necessary to correct perspective distortion for both the x-axis and y-axis directions. In one embodiment, the x-axis and y-axis define different scan lines on the platen 12. Alternatively, a scan line is any series of adjacent data points on the platen 12.

Figure 3B:
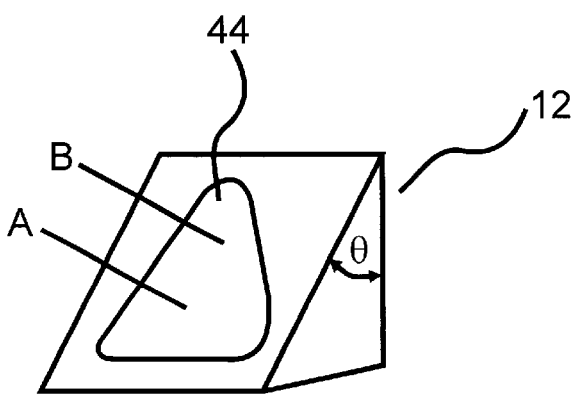
FIG. 3b is a perspective diagram of a modified prism of the present invention.
Figure 3C:
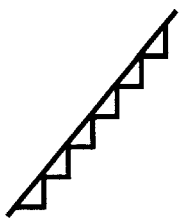
FIG. 3c is a side view of a modified multi-prism of the present invention.

Referring to FIG. 3b, shown is a perspective of a modified prism 35 of the present invention. The modified prism has an output port 44. It has been found that by having a recess with a correctly contoured surface it is possible to reduce perspective distortion by approximately 96%. Borders of the recess are in the shape of a triangle with rounded corners. The image of an object touching the surface of the platen 12 along line A is reduced in the x-axis to a lesser extent than an object along line B. Therefore, a fingerprint placed on the platen 12 is corrected for perspective size difference between the portion at the top of the platen 12 and that portion at the bottom of the platen 12. Similarly, as shown in FIG. 3c, it is possible to provide a modification to the output ports of the multi-prism 30 such perspective distortion is significantly eliminated.

Figure 3D:
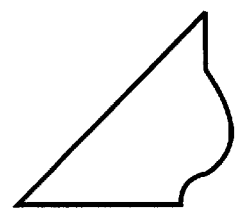
FIG. 3d is a side view of a modified prism of the present invention.

Referring to FIG. 3d, another prism for performing perspective distortion correction is shown. Here, instead of shrinking the image along the horizontal axes, the image is expanded along the vertical axis. Again, correction is performed by other than a spherical or cylindrical surface contour. Generally, it is preferred that the prism of FIG. 3b is used because it reduces the necessary material for manufacturing the prism, reduces the area of the image sensor and so forth. Since the optics of the prism are analogue, there are substantial advantages to reducing overall image size.

Figure 3E:
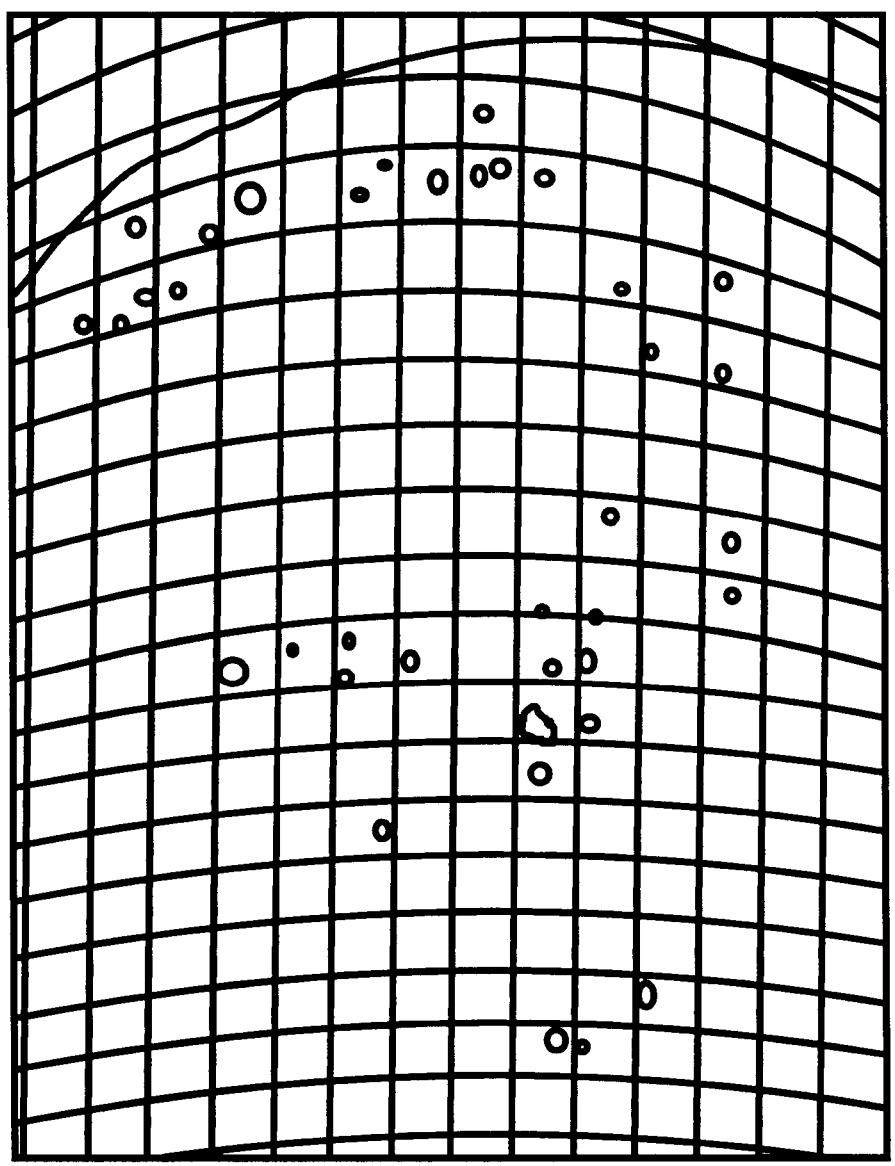
FIG. 3e is an image of a grid captured using an optical contact imager according to the invention.

Referring to FIG. 3e, an image of a grid imaged through an optical component according to the invention is shown. Here, the grid elements appear near square and an equal number of squares is shown across each row. Thus, when software correction of distortion is performed, nearly all the information is used and maintained within the final image. This is highly advantageous. Further, the use of corrective optics results in more information—more squares—within the image.

Optical geometry of optical fingerprint-imaging devices and principles governing them are known. These allow determination of perspective distortion. It has now been found that it is possible to correct for some of the perspective distortion resulting from optical contact imaging of for example fingerprints. As one skilled in the art will appreciate the nature of light and optics are well understood. In particular, it is possible to calculate the shape of a lens or the shape of a contoured reflective surface for incorporation into an optical fingerprint-imaging device for a predetermined correction of distortion. It is possible to compensate for perspective distortion by changing the shape of the output port 9 and/or the platen 12 such that it directs light from the platen in accordance with a substantially undistorted image of a biometric surface presented to the platen. This is achieved using a lens, by incorporating a contoured lens into the prism, or by incorporating a contoured reflective surface between the prism and the image sensor. These components are termed perspective correction optical components. One skilled in the art will appreciate that a perspective correction optical component has a complex surface in comparison to a planar, spherical and/or cylindrical lens or shaped surface. A reason for the complex surface is that a perspective correction at a particular location on a scan line is not uniformly applied to all other scan lines. An evenly curved or cylindrically shaped surface applies a substantially uniform correction. In this regard, an evenly curved or cylindrically shaped surface is not suitable for applying a perspective correction to an optical fingerprint-imaging device.

A perspective correction optical component of the present invention has a complex three-dimensional contour. The complex contour is describable by a set of equations. Preferably, the surface is a smoothly curved surface defined, 1 for example, by a hyberbolic function. In contrast to an equation that describes a cylindrical or spherical shaped surface, a more sophisticated equation/function is required to describe the contours of the perspective correction optical component. The complex contours of a perspective correction optical component have non-planar, non spherical and non-cylindrical contours that vary smoothly in three dimensions.

Figure 4:
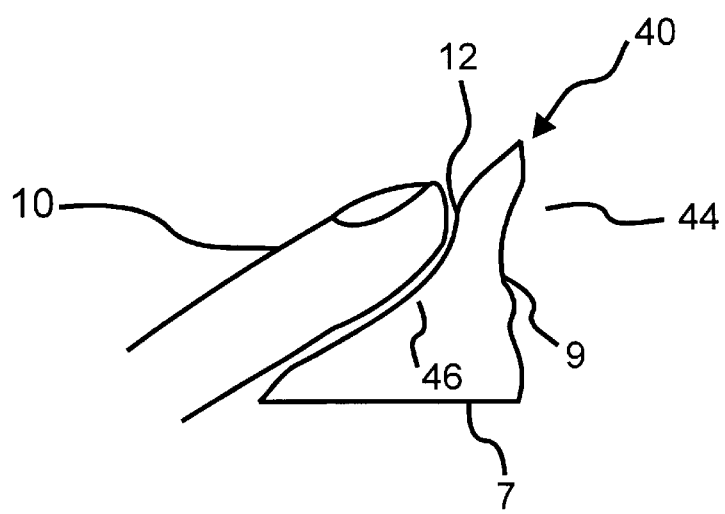
FIG. 4 is a side view of another modified prism 40 of the present invention.

Referring to FIG. 4, shown is a side view of another modified prism 40 of the present invention. The modified prism 40 has a platen 12 having a recess 46 therein. The recess 46 allows a fingertip to contact more easily the platen surface 12 over prior art flat platens. An output port 9 is shown as a corrective contoured recess 44 such as that shown in FIG. 3b. Alternatively, the output port 9 is a corrective contoured protrusion such as that shown in FIG. 3d. It is possible to manufacture a perspective correction lens, having one planar surface, for gluing to a planar output port with a refractive index matching glue. Alternatively, either the corrective recess 44 or a corrective recess 46 or both is present and reduces perspective distortion.

In a similar manner to FIG. 4, it is possible to modify each output port of a staircase-shaped prism 28 along with the platen surface 12 to provide a perspective correction for a desired platen surface contour.

Figure 5:
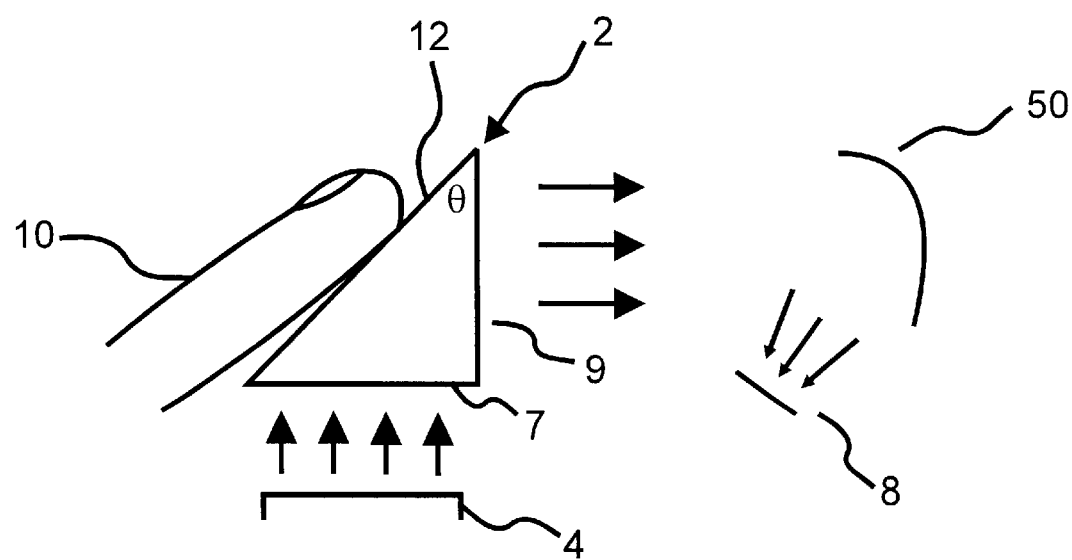
FIG. 5 is a side view of an optical fingerprint-imaging device of the present invention; and, FIG. 6 is a side view of an optical fingerprint-imaging device of the present invention.

Referring to FIG. 5, shown is a side view of an optical fingerprint-imaging device of the present invention. Light emerges from the output port 9 in a similar manner as described in FIG. 1. The light is incident on a shaped reflective surface 50, which corrects for perspective distortion before light is incident on the detector. The shaped reflective surface 50 is non-spherical and non-cylindrical. The reason for a non-spherical and non-cylindrical reflective surface is the same as mentioned above, namely, a perspective correction at a particular location on a scan line is not uniformly applied to all other scan lines. An evenly curved or cylindrically shaped surface applies a substantially uniform correction.

Figure 6:
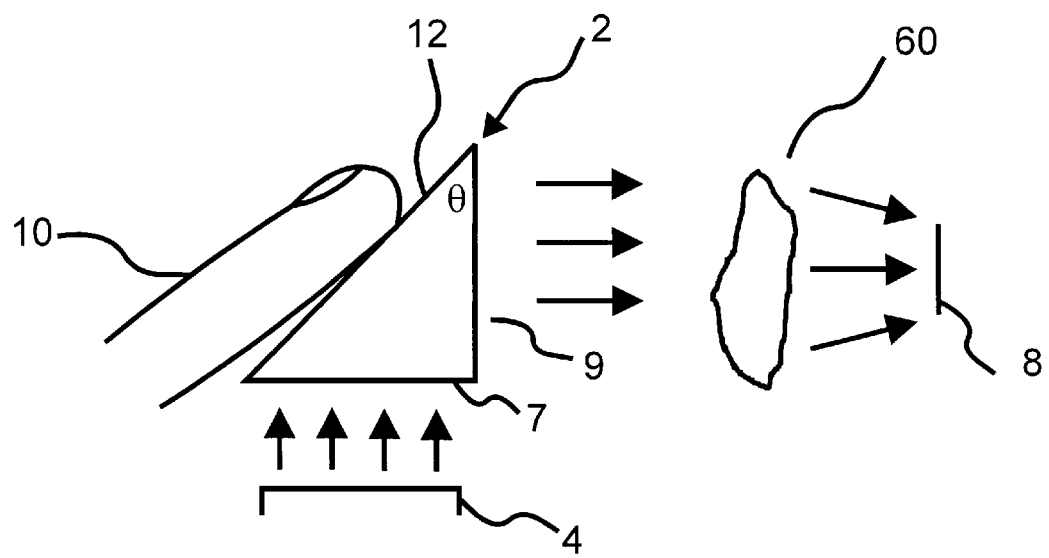

Referring to FIG. 6, shown is a side view of an optical fingerprint-imaging device of the present invention. Light emerges from the output port 9 in a similar manner as described in FIG. 1. The light is incident on a contoured lens 60, which corrects for perspective distortion before light is incident on the image sensor 8. The contoured lens 60 is non-spherical and non-cylindrical as detailed above.

Figure 7:
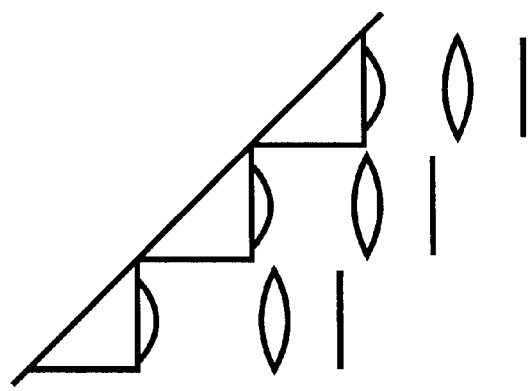
FIG. 7 is a side view of an optical fingerprint imaging device having a multi-prism and a plurality of image sensors.

Referring to FIG. 7, an optical imaging device having multiple lenses which are associated with respective CCDs is shown. The optical path between the lenses and the CCDs is shortened. A multi-prism is shown in combination with the multiple lens and multiple CCD arrangement. Perspective distortion is reduced by incorporating a plurality of contoured lens, or by incorporating a plurality of contoured reflective surfaces as shown. The resulting contact imager supports high resolution imaging with reduced optical path length and simplified correction of optical perspective distortion since correction is required for a smaller perspective distortion within each image portion than exists across the entire imaged area.

By applying a perspective correction, it is possible to reduce the image sensor size because the perspective correction provides a better focused image. A reduction in the image sensor size results in a reduction in cost of component parts of an optical fingerprint-imaging device. An optical fingerprint-imaging device having a perspective distortion correction has a single corrective optic or a plurality of corrective optics.

The present invention also extents to a method for determining a perspective distortion correction for application to an optical fingerprint-imaging device. The geometry of an optical fingerprint-imaging device is known, for example, referring again to FIG. 1, distances $d_1$, $d_2$, angles $\theta$ and $\alpha$, and the dimensions of the lens 6 are known, as are any additional optical components present. Knowledge of the geometry of an optical fingerprint-imaging device permits calculation of geometry for additional optical components or of geometry for modifications required to result in correction of perspective distortion. By predetermining a required correction of perspective distortion, it is possible to manufacture economically viable components, for example, by form molding. As one skilled in the art will appreciate the molding cost of an optical reading component is far less than removing material from an existing optical reading component.

Figure 8:
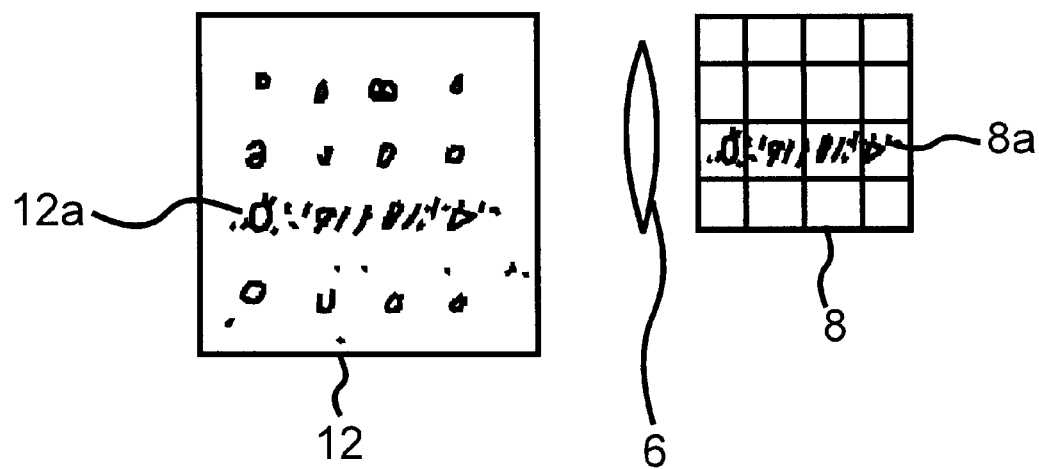
FIG. 8 is a diagram of a platen and a an image sensor.

Referring to FIG. 8, a platen 12 is shown with a grid of points disposed thereon. The grid is evenly spaced along the x and y axes. Alternatively, other spacing is also possible when design requirements dictate. An image sensor in the form of a CCD array is shown wherein each element within the array corresponds to a point on the grid of points shown on the platen 12. By calculating the path of light reflected from the platen traveling through the lens 6 to the image sensor, an error is determined between an actual target location on the image sensor surface and the target location selected for the point on the platen 12. This error relates to distortion within the image corrective optics are disposed between the platen and the image sensor in order to correct the location of the point. When this is performed for all points, distortion is substantially minimised. Of course, it is preferable to force the corrective optics into a smooth contour in order to eliminate discontinuities and problems stemming therefrom.

Figure 9:
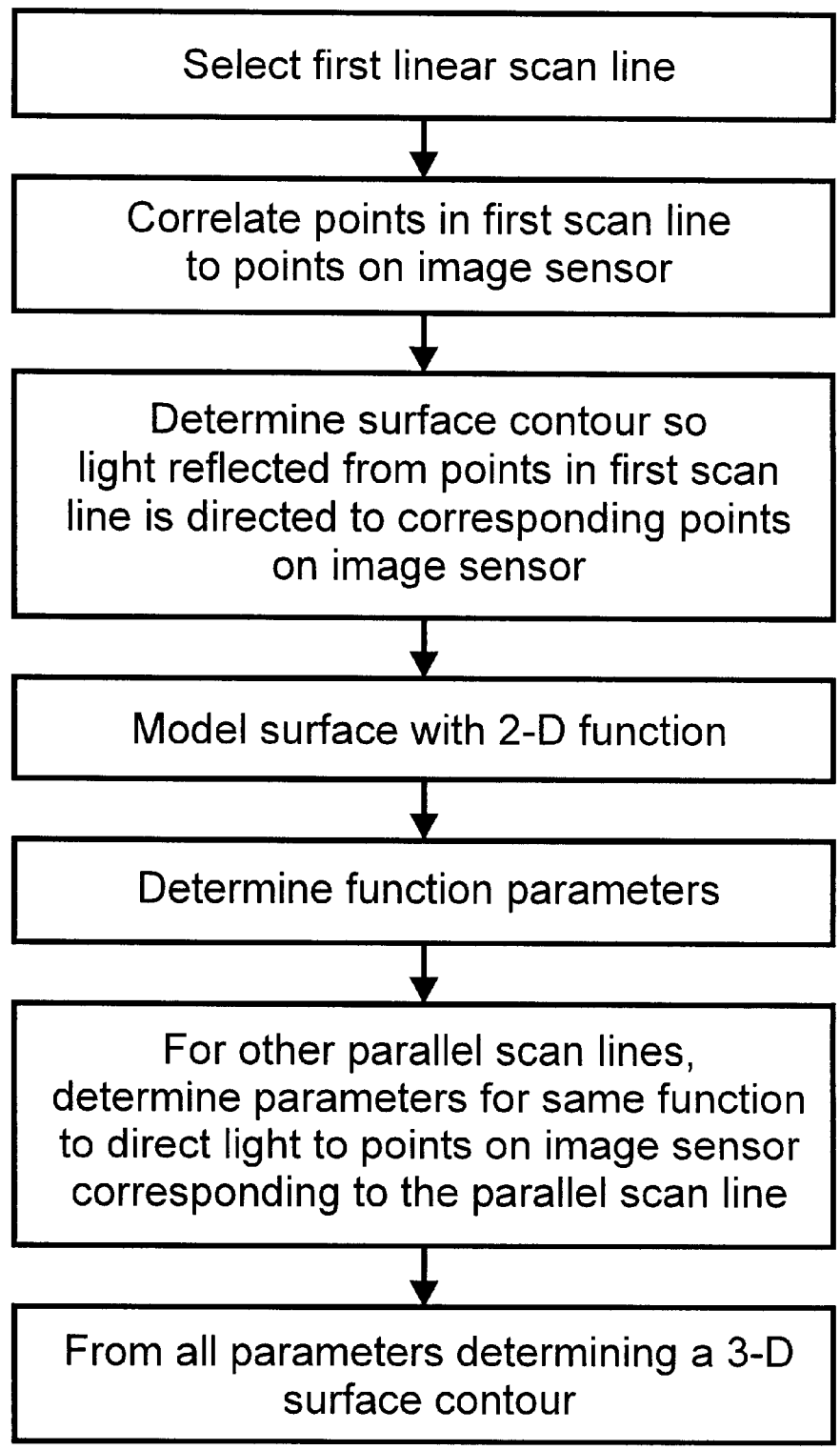
FIG. 9 is a simplified flow diagram of a method of correcting for distortion according to the invention.

Referring to FIG. 9, a simplified flow diagram of a method of performing distortion correction is shown. An approach for designing a corrective modification having a smooth contour for the prism output port 9 is to examine first a single linear scan line 12a on the platen 12 and its corresponding array elements 8a on the image sensor 8. Commonly the associated elements are linear or near linear but this need not be so. A function that closely models the optically corrective surface is determined for the single scan line 12a such that light therefrom is provided to predetermined positions 8a on the image sensor 8. This results in an image of the scan line that is corrected for perspective distortion and, when desirable, for other forms of distortion, and the function describes an optical surface to correct for the distortion. In the embodiment shown in FIG. 3b a single horizontal scan line has a corrective function in the form of a hyperbolic function. The hyperbolic function in effect describes a "slice" through a corrective optical component.

The hyperbolic function contains a plurality parameters, typically four or five parameters. It is assumed that the hyperbolic function is applicable as a corrective equation for a neighbouring scan line but with variations in the parameters. The parameters are varied within predetermined limits to determine another hyperbolic equation for correcting perspective distortion of the neighbouring scan line. The predetermined limits of the parameters serve to prevent discontinuity in a described surface. When sufficient neighbouring scan lines have been examined and their hyperbolic functions determined a continuous surface is described. The hyperbolic functions that describe the continuous surface provide an optical surface function. The continuous surface describes an optical surface that corrects for perspective distortion. It is possible for the optical surface to describe a recessed platen 44, an optical modification to the output port 9, a corrective lens 60, or a corrective reflective surface 50.

As another non-limiting protocol to determine a perspective distortion correction, a first reading coordinate on the platen is correlated to an image point on the image sensor and the process repeated a number of times. A two dimensional relationship is determined between the reading coordinates on the platen and image points on the image sensor. Contours of an optical surface are determined for perturbing the light such that light reflecting from a predetermined point on the platen is incident on a predetermined point on the image sensor surface. When sufficient platen coordinates have been correlated with corresponding image sensor coordinates on the image sensor and an optical surface determined for ensuring their respective relationships, that optical surface corrects the distortion. Equations describing an optical surface may take many forms, for example, a hyperbolic, a parabolic or a quadratic function. It is possible for a recess to be described as an amount to be removed, Cut, from a flat output port 9, for example, $Cut=[\sqrt{x^2+b^2}-b]-a$ where $b=c(y-d)+e(y-d)^2$. Parameter a relates to depth of cut and as such is related to design choices and overall prism size parameter b relates to c, d, and e as shown in the second equation and is based on hyperbolic correction of distortion and so forth. Since these parameters are modified with each scan line, a smooth transition between adjacent hyperbolic functions can be maintained while correcting much of the perspective distortion within an image captured using the contact imager of the present invention. Numerous other embodiments may be envisaged without departing from the spirit and scope of the invention.

What is claimed is:

1. A corrective optical component comprising:
   an input port for input light;
   an output port comprising a smooth contoured complex surface for altering a path of light emerging from the output port, the smooth contoured complex surface shaped for correcting a perspective distortion; and,
   a platen for receipt of a biometric surface and for reflecting some of the input light received at the input port toward the output port.

2. A perspective correction optical component according to claim 1, wherein the smooth contoured complex surface defines a recess.

3. An optical component as defined in claim 2 wherein the smooth contoured complex surface has a concave contour.

4. A perspective correction optical component according to claim 3, wherein the recess describes a surface contour other than a planar, cylindrical or spherical surface contour.

5. An optical component as defined in claim 3 wherein the smooth contoured complex surface has a contour for altering the path of light emerging from the output port, the path altered to narrow a beam of light along an axis perpendicular to an axis of the perspective distortion.

6. An optical component as defined in claim 1 wherein the smooth contoured complex surface has a convex contour.

7. An optical component as defined in claim 6 wherein the smooth contoured complex surface has a contour for altering the path of light emerging from the output port, the path altered to magnify a beam of light along an axis of the perspective distortion.

8. A corrective optical component comprising:
   an input port;
   an interrogating light source for launching light into the input port;
   a platen having a platen surface for receipt of a biometric surface, the platen surface for reflecting light received from the input port;
   a perspective correction optical component including a contoured surface shaped for altering the path of the reflected light to correct for a perspective distortion of the biometric surface; and,
   a detector for receiving the corrected reflected light and for providing a signal in dependence thereon.

9. A corrective optical component according to claim 8, wherein the perspective correction optical component comprises a contoured platen, wherein the contours of the platen are complex.

10. A corrective optical component according to claim 8, wherein the input port, the platen and the perspective correction optical component are in the form of a single optical element and wherein the perspective correction optical component comprises a contoured surface disposed optically between the platen and the detector, wherein the contours of the surface are complex.

11. A corrective optical component according to claim 8, wherein the perspective correction optical component comprises a contoured lens, wherein the contours of the lens are complex.

12. A corrective optical component according to claim 8, wherein the perspective correction optical component comprises a contoured reflective surface, wherein the contours of the reflective surface are complex.

13. A method of determining a perspective distortion correction for an optical contact imager having a platen and an image sensor for detecting light received from the platen, the method comprising the steps of:

(a) selecting a platen scan line on the platen;

(b) selecting an image scan line on the image sensor;

(c) selecting pairs of points each pair comprising a point on the platen scan line and a corresponding point on the image scan line;

(d) determining a two-dimensional surface contour function for constructing a smooth contoured complex surface shaped for correcting the perspective distortion by directing light from each point within the platen scan line to a corresponding point within the image scan line.

14. A method of determining a perspective distortion correction for an optical contact imager as defined in claim 13 comprising the step of: iterating steps (a) to (d) for a plurality of platen scan lines and corresponding image scan lines.

15. A method of determining a perspective distortion correction for an optical contact imager as defined in claim 14 wherein during each iteration a scan line adjacent that scan line selected for a previous iteration is selected and wherein the determined surface contour has a similar function with parameters thereof varied within predetermined limits to produce a smooth optically corrective contour function.

16. A method of determining a perspective distortion correction for an optical biometric-imager according to claim 15, wherein adjacent scan lines are parallel to each other.

17. A method of determining a perspective distortion correction for an optical biometric-imager according to claim 14, wherein the step of determining a two-dimensional surface contour function comprises the steps of:

determining a function describing the determined contour;

determining at least a modifiable parameter within the function;

during iterations after the first iteration, varying the at least a parameter of the function within predetermined limits to determine a further two-dimensional surface contour defined by the same function having varied parameters which describes a further optically corrective surface contour.

18. A method of determining a perspective distortion correction for an optical biometric-imager according to claim 17, such that the two-dimensional surface contour function and the further two-dimensional surface contour function vary smoothly from one to the other.

19. A method of determining a perspective distortion correction for an optical biometric-imager according to claim 17, wherein the determined surface contour is hyperbolic.

* * * * *